United States Patent
Kado et al.

(10) Patent No.: US 6,950,230 B2
(45) Date of Patent: Sep. 27, 2005

(54) PUMP LIGHT SOURCE FOR RAMAN AMPLIFIER AND RAMAN AMPLIFIER USING THE SAME

(75) Inventors: Soko Kado, Tokyo (JP); Yoshihiro Emori, Tokyo (JP)

(73) Assignee: The Furukawa Electric Co., Ltd., Tokyo (JP)

(*) Notice: Subject to any disclaimer, the term of this patent is extended or adjusted under 35 U.S.C. 154(b) by 454 days.

(21) Appl. No.: 10/061,287

(22) Filed: Feb. 4, 2002

(65) Prior Publication Data

US 2002/0159133 A1 Oct. 31, 2002

(30) Foreign Application Priority Data

Feb. 2, 2001 (JP) ........................................ 2001-027201

(51) Int. Cl.[7] .............................................. H01S 3/00
(52) U.S. Cl. ................................... 359/334; 359/341.3
(58) Field of Search ............................. 359/334, 341.3

(56) References Cited

U.S. PATENT DOCUMENTS

| | | |
|---|---|---|
| 4,401,364 A | 8/1983 | Mochizuki |
| 4,616,898 A | 10/1986 | Hicks, Jr. |
| 4,699,452 A | 10/1987 | Mollenauer et al. |
| 5,673,280 A | 9/1997 | Grubb et al. |
| 5,887,093 A | 3/1999 | Hansen et al. |
| 5,946,428 A | 8/1999 | Aleksandrov et al. |
| 5,959,750 A | 9/1999 | Eskildsen et al. |
| 5,966,206 A | 10/1999 | Jander |
| 5,966,480 A | 10/1999 | LeGrange et al. |
| 6,038,356 A | 3/2000 | Kerfoot, III et al. |
| 6,052,219 A | 4/2000 | Kidorf et al. |
| 6,081,323 A | 6/2000 | Mahgerefteh et al. |
| 6,081,366 A | 6/2000 | Kidorf et al. |
| 6,115,174 A | 9/2000 | Grubb et al. |
| 6,147,794 A | 11/2000 | Stentz |
| 6,163,636 A | 12/2000 | Stentz et al. |
| 6,178,038 B1 | 1/2001 | Taylor et al. |
| 6,181,464 B1 | 1/2001 | Kidorf et al. |
| 6,191,877 B1 | 2/2001 | Chraplyvy et al. |
| 6,212,310 B1 | 4/2001 | Waarts et al. |
| 6,263,139 B1 | 7/2001 | Kawakami et al. |
| 6,266,180 B1 | 7/2001 | Inagaki et al. |
| 6,282,002 B1 | 8/2001 | Grubb et al. |
| 6,292,288 B1 * | 9/2001 | Akasaka et al. ............ 359/334 |
| 6,320,695 B1 | 11/2001 | Tanaka et al. |
| 6,320,884 B1 | 11/2001 | Kerfoot, III et al. |
| 6,344,922 B1 * | 2/2002 | Grubb et al. ............... 359/334 |
| 6,510,000 B1 * | 1/2003 | Onaka et al. ............... 359/334 |
| 6,624,926 B1 * | 9/2003 | Hayashi et al. ............. 359/334 |

FOREIGN PATENT DOCUMENTS

EP          001182808 A2 *    2/2002

* cited by examiner

*Primary Examiner*—Mark Hellner
(74) *Attorney, Agent, or Firm*—Oblon, Spivak, McClelland, Maier & Neustadt, P.C.

(57) ABSTRACT

When varying the Raman gain or the gain tilt of an optical amplifier, there is no need to individually adjust the output level of every pump light source or perform overall adjustment, making it possible to obtain a targeted gain with little adjustment. For this purpose, in a pump light source for Raman amplification for outputting a plurality of pump lightwaves for effecting Raman amplification on signal lightwaves input to a light transmission path in the light transmission path: the pump light source for Raman amplification is divided into a shorter wavelength light source and a longer wavelength light source which differ in oscillation wavelength; a plurality of lightwaves emitted from the shorter wavelength light source and a lightwave emitted from the longer wavelength light source are coupled and output; and the plurality of lightwaves output from the shorter wavelength light source or the lightwave output from the longer wavelength light source is collectively controlled to adjust the intensity of the output light.

14 Claims, 6 Drawing Sheets

PUMP LIGHT SOURCE FOR RAMAN AMPLIFIER AND RAMAN AMPLIFIER USING THE SAME

TECHNICAL FIELD

The present invention relates to a pump light source for a Raman amplifier for optically amplifying signal lightwaves in a light transmission path such as an optical fiber by utilizing stimulated Raman scattering and to a Raman amplifier using the same.

BACKGROUND ART

As shown in FIG. 9, generally speaking, in a Raman amplification system, when guiding an optical signal 2 output from a light transmitting station 1 to a light receiving station 4 through a light transmission path 3, such as an optical fiber, an optical amplifier 5 is arranged at some midpoint in the light transmission path 3 or at an end thereof to optically amplify the optical signal so that the optical signal 2, which has been attenuated in the light transmission path 3, may attain the requisite optical signal level for reception by the light receiving station 4. However, in some cases, the optical amplifier 5 is provided at the forward end or both ends of the light transmission path 3.

In the light transmitting station 1, electrical information to be transmitted is converted into light to be output to the light transmission path 3. An electric signal is converted to an optical signal by applying it directly to a semiconductor laser diode or the like serving as the signal light source or by modulating the light oscillated from the signal light source by an external modulator provided behind the signal light source before it is output to the light transmission path 3.

In the light receiving station 4, the optical signal 2 propagated through the light transmission path 3 is converted into an electric signal by a photoelectric converter, such as a photo diode, and the information transmitted from the light transmitting station 1 is demodulated, whereby the information is read.

As shown in FIG. 8, in the Raman amplifier 5, oscillation light from a pump light source 7 is input to a Raman amplification medium 31 through an optical coupler 6 from an end portion of the Raman amplification medium 31 constituting a part of the light transmission path 3 to cause Raman scattering in the Raman amplification medium 31, thereby effecting Raman amplification on the optical signal 2. Usually, the wavelength of the oscillation light to be selected is shorter than the wavelength of the optical signal 2 from the light transmitting station 1 by approximately 20 to 200 nm.

The Raman gain due to the Raman amplification in the Raman amplification medium 31 allows light amplification over a wide range. However, it does not allow uniform amplification over a wide signal band, exhibiting wavelength properties in amplification gain. Thus, to effect uniform Raman amplification over a wide signal band, a plurality of pump light sources of different wavelengths from each other are used in order to adjust the intensity of the pump lightwaves such that Raman gain is uniform over the signal band.

As described above, by adjusting each of a plurality of pump lightwaves, it is possible to adjust the optical signal such that the amplification gain properties are fixed over the entire signal band. However, when changing the once uniformly adjusted gain to some other gain, it has conventionally been general practice to individually readjust the intensity of the oscillation light output from each of the light sources over all the light sources.

However, the above method in which the intensity of oscillation light of a plurality of light sources is adjusted has a problem in that the gain of a specific signal band is not adjusted by adjusting one of the plurality of light sources; it involves a change in the gain of a still wider signal band including the specific signal band, so that it is not easy to adjust the gain to a desired value.

SUMMARY OF THE INVENTION

The present inventor used semiconductor LDs with the following oscillation wavelengths: λ1=1423.516 nm, λ2=1430.990 nm, λ3=1438.543 nm, and λ=1460.265 nm, adjusting such that their respective pump intensities are 248.0 mW, 170.0 mW, 128.0 mW, and 264.5 mW as shown in (1) of Table 1. As a result, a flat gain of 25 dB was obtained in the signal band of 1530 to 1560 nm as shown in (1) of FIG. 7.

Thereafter, as shown in (2) through (5) of Table 1, signal band gain was measured with all the pump intensities reduced to 80%, 60%, 40%, and 20% to obtain values as indicated by the solid lines (2) through (5) of the FIG. 7. These solid lines indicate that although flatness of the signal band gain is maintained, the gains at the longer wavelength vary to a somewhat greater as compared with the gains at the shorter wavelength, indicating negative gain tilts.

TABLE 1

|     | Shorter wavelength group | | | Longer wavelength group |
| --- | --- | --- | --- | --- |
|     | λ1 | λ2 | λ3 | λ4 |
| (1) |     | 100% |     |     |
|     | 248.0 | 170.0 | 128.0 | 264.5 |
| (2) |     | 80% |     |     |
|     | 199.2 | 136.0 | 102.4 | 211.6 |
| (3) |     | 60% |     |     |
|     | 149.4 | 102.0 | 76.8 | 158.7 |
| (4) |     | 40% |     |     |
|     | 99.6 | 68.0 | 51.2 | 105.8 |
| (5) |     | 20% |     |     |
|     | 49.8 | 34.0 | 25.6 | 52.9 |
|     |     |     |     | [mW] |

Further, while maintaining the pump intensity of the semiconductor LD of 1460.265 nm at 100%, signal band gain was measured with the pump intensity of three shorter wavelengths semiconductor LDs of 1423.516 nm, 1430.990 nm, and 1438.543 nm reduced to 80%, 60%, 40%, and 20%, as shown in (6) through (9) of Table 2. The results are the values indicated by the solid lines (6) through (9) of FIG. 6. In these solid lines, the gain at the shorter wavelength of the signal band varies more greatly than the gain at the longer wavelength, and the gain flatness is sufficient.

TABLE 2

|     | Shorter wavelength group | | | Longer wavelength group |
| --- | --- | --- | --- | --- |
|     | λ1 | λ2 | λ3 | λ4 |
| (6) |     | 80% |     | 100% |
|     | 199.2 | 136.0 | 102.4 | 264.5 |
| (7) |     | 60% |     | 100% |
|     | 149.4 | 102.0 | 76.8 | 264.5 |
| (8) |     | 40% |     | 100% |
|     | 99.6 | 68.0 | 51.2 | 254.5 |

TABLE 2-continued

|  | Shorter wavelength group | | | Longer wavelength group |
| --- | --- | --- | --- | --- |
|  | λ1 | λ2 | λ3 | λ4 |
| (9) |  | 20% |  | 100% |
|  | 49.8 | 34.0 | 25.6 | 264.5 |
| (10) |  | 100% |  | 80% |
|  | 248.0 | 170.0 | 128.0 | 211.6 |
| (11) |  | 100% |  | 60% |
|  | 248.0 | 170.0 | 128.0 | 158.7 |
| (12) |  | 100% |  | 40% |
|  | 248.0 | 170.0 | 128.0 | 105.8 |
| (13) |  | 100% |  | 20% |
|  | 248.0 | 170.0 | 128.0 | 52.9 |
|  |  |  |  | [mW] |

Further, while maintaining the pump intensity of the three shorter wavelengths semiconductor LDs at 100%, the present inventor performed signal band gain measurement with the pump intensity of the semiconductor LD of 1460.265 nm reduced to 80%, 60%, 40%, and 20%, as shown in (10) through (13) of Table 2. The results are the values indicated by the dotted lines (10) through (13) of FIG. 6. In these dotted lines, the gain at the shorter wavelength of the signal band does not vary compared with the gain at the longer wavelength, and the gain flatness is sufficient.

The present inventor divided pumps optimized so as to obtain flat gain properties in a certain signal band into Group A of the shorter wavelength and Group B of the longer wavelength to find out the following:

A. When the pump powers of Groups A and B are lowered at the same rate, the Raman gain indicates a decrease with a negative tilt.

B. When the pump powers of the Group B are all lowered at the same rate while maintaining the pump power of Group A at 100%, the Raman gain indicate a decrease with a negative gain tilt.

C. When the pump powers of the Group A are all lowered at the same rate while maintaining the pump power of Group B at 100%, the Raman gain indicates a decrease with a positive tilt.

Further, although not shown, by increasing the pump powers of Groups A and B, the following have been found out:

D. When the pump powers of Groups A and B are raised at the same rate, the Raman gain indicates an increase in level with a positive tilt.

E. When the pump powers of the Group B are all raised at the same rate while maintaining the pump power of Group A at 100%, the Raman gain indicate an increase with a positive tilt.

F. When the pump powers of the Group A are all raised at the same rate while maintaining the pump power of Group B at 100%, the Raman gain indicates an increase with a negative tilt.

Further, when optical fibers of different amplification factors are used as shown in (14) through (18) of Table 3, the different gain properties are obtained even if the same pump power is supplied, as shown in FIG. 5. That is, the following facts are ascertained:

G. When an optical fiber of a large Raman gain coefficient is used, the Raman gain properties indicate an increase with a positive tilt.

E. When an optical fiber of a small Raman gain coefficient is used, the Raman gain properties indicate a decrease with a negative tilt.

TABLE 3

|  | Gain coefficient | Rate of change |
| --- | --- | --- |
| (14) | 2.045 | 100% |
| (15) | 4.090 | 200% |
| (16) | 3.272 | 160% |
| (17) | 2.454 | 120% |
| (18) | 1.636 | 80% |

Thus, it has been found but that by combining the above techniques of A through H, it is possible to easily design a Raman amplifier with good gain flatness and having an arbitrary gain level and tilting.

The present invention has been made in view of the above facts. In accordance with the present invention, pump wavelengths are divided into two groups; the shorter wavelengths and the longer wavelengths, which are arbitrarily adjusted, whereby it is possible to obtain arbitrary gain properties.

In accordance with the present invention, there is provided a pump light source for outputting a plurality of pump lightwaves for effecting Raman amplification on signal lightwaves input to a light transmission path, wherein: the pump light source for Raman amplification is divided into light source whose oscillation wavelengths are the shorter. (hereinafter referred to as "shorter wavelength light source) and light source whose oscillation wavelengths are the longer (hereinafter referred to as "longer wavelength light source); a plurality of lightwaves emitted from the shorter wavelength light source and a lightwave emitted from the longer wavelength light source are coupled and output; and the plurality of lightwaves output from the shorter wavelength light source or the lightwave output from the longer wavelength light source is collectively controlled to adjust the intensity of the output light.

In accordance with the present invention, there is further provided a Raman amplifier including a light transmitting station for emitting signal lightwaves, a light receiving station for receiving the signal lightwaves, a light transmission path for propagating the signal lightwaves from the light transmitting station to the light receiving station, and a pump light source for Raman amplification which introduces pump lightwaves into the light transmission path to cause Raman scattering in the light transmission path to thereby effect Raman amplification on the signal lightwaves, wherein the pump light source for Raman amplification is as claimed in one of claims 1 through 5.

EMBODIMENTS OF THE INVENTION

Figure 1:
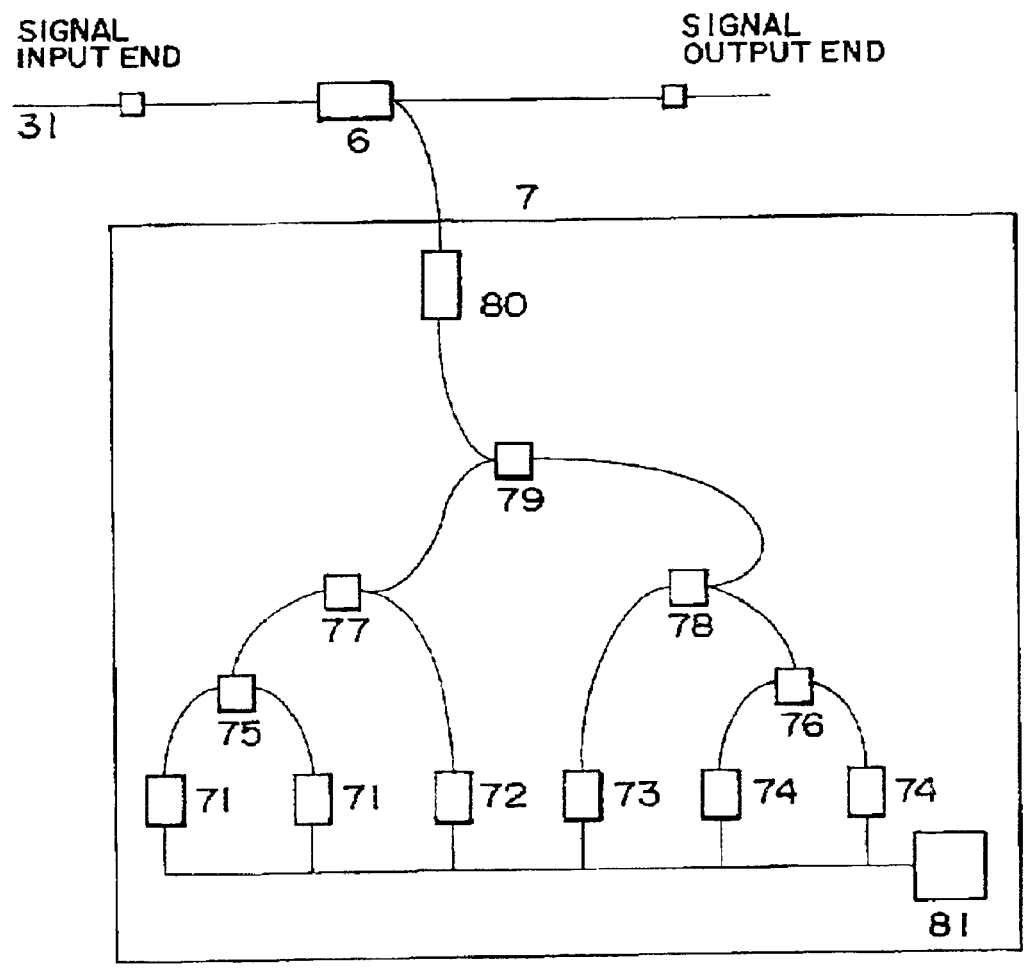
FIG. 1 is a schematic diagram showing an embodiment of the present invention.

FIG. 1 is a schematic diagram showing an embodiment of the present invention. In the drawing, 31, 6, and 7 respectively indicate a Raman amplification medium, such as a silica-based optical fiber, an optical coupler for coupling pump lightwaves with signal lightwaves to be integrated in the Raman amplification medium, and a Raman amplification pump light source. 71·71 indicate semiconductor laser diodes of an oscillation wavelength of 1423.516 nm, 72 indicates a semiconductor laser diode of an oscillation wavelength of 1430.990 nm, 73 indicates a semiconductor laser diode of an oscillation wavelength of 1438.543 nm, and 74·74 indicate semiconductor laser diodes of an oscillation wavelength of 1460.265 nm. 75 and 76 indicate polarization beam combiner, 77, 78, and 79 indicate wavelength optical multiplexers for coupling two lightwaves, and 80 indicates an optical isolator. 81 indicates a current controller capable of supplying drive current to the semiconductor laser diodes 71 through 74 and controlling the current values thereof.

The lightwaves from the semiconductor laser diodes 71·71 are coupled in the polarization beam combiner 75 such that their states of polarization differ from each other by 90 degrees, and then output. Similarly, the lightwaves from the semiconductor laser diodes 74·74 are coupled in the polarization beam combiner 76 such that their states of polarization differ from each other by 90 degrees, and then output. The lightwaves from the semiconductor laser diodes 71·71, coupled by the polarization beam combiner 75, and the lightwave from the semiconductor laser diode 72 are coupled by the wavelength optical multiplexer 77. The lightwaves from the semiconductor laser diodes 74·74, coupled by the polarization beam combiner 76, and the lightwave from the semiconductor laser diode 73 are coupled by the wavelength optical multiplexer 78. The lightwaves output from the wavelength optical multiplexers 77 and 78 are coupled by the wavelength optical multiplexer 79, and guided to the Raman amplification medium 31 through the optical coupler 6 and the isolator 80.

Forty-four input signals in substantially uniform variation between wavelengths of 1527.994 nm and 1562.233 nm are introduced into the Raman amplification medium 31 from the input end in a magnitude of substantially −15 dBm/ch. The semiconductor laser diodes 71·71 are adjusted by the current controller 81 such that optical powers of them are the same each other. Furthermore, the semiconductor laser diodes 74·74 are adjusted by the current controller 81 such that optical powers of them are the same each other.

In the above condition, the drive current for the semiconductor laser diodes 71 through 74 was adjusted by the current controller 81, an optical spectrum analyzer (not shown) was mounted to the output end, and current adjustment was performed such that the gain was approximately 25 dB and flat over the entire signal band. The light intensities of the semiconductor laser diodes 71 through 74 at this time were respectively 248 mW, 170 mW, 128 mW, and 264.5 mW as shown in (1) of Table 4, (The intensity of light output from each of the semiconductor laser diodes 71 and 74 is ½ thereof). At this time, the gain is within the range of 24.74 to 25.30 dB, and is in a substantially flat state as shown in (1) of FIG. 2. In the present invention, this value will be defined as pump power 100% for the sake of convenience.

TABLE 4

| | Shorter wavelength group | | | Longer wavelength group |
|---|---|---|---|---|
| | λ1 | λ2 | λ3 | λ4 |
| (1) | 248.0 | 100% 170.0 | 123.0 | 100% 264.50 |
| (2) | 348.60 | 140% 238.00 | 179.20 | 113% 343.85 |
| (3) | 149.40 | 60% 102.00 | 76.80 | 84% 211.60 |
| (4) | 77.688 | 31.2% 53.040 | 39.936 | 60% 158.700 [mW] |

Next, similarly, by controlling the semiconductor laser diodes 71 through 74 by the current controller 81, the light intensity of the semiconductor laser diodes 71 through 73 was increased to 140%, and the light intensity of the semiconductor laser diode 74 was increased to 113%, as shown in (2) of Table 4. The respective light intensities of the semiconductor laser diodes 71 through 74 at that time were 348.6 mW, 238 mW, 179.2 mW, and 343.85 mW (The light intensity of the light output from each of the semiconductor laser diodes 71 and 74 is ½ thereof). The gain at this time is within the range of 30.01 to 30.77 dB, and is in a substantially flat state as shown in (2) of FIG. 2.

Next, similarly, by controlling the semiconductor laser diodes 71 through 74 by the current controller 81, the light intensity of the semiconductor laser diodes 71 through 73 was reduced to 60%, and the light intensity of the semiconductor laser diode 74 was reduced to 84%, as shown in (3) of Table 4. The respective light intensities of the semiconductor laser diodes 71 through 74 at that time were 149.4 mW, 102 mW, 76.8 mW, and 211.6 mW (The intensity of the Light output from each of the semiconductor laser diodes 71 and 74 is ½ thereof). The gain at this time is within the range of 17.36 to 17.76 dB, and is in a substantially flat state, as shown In (3) of FIG. 2.

Figure 2:
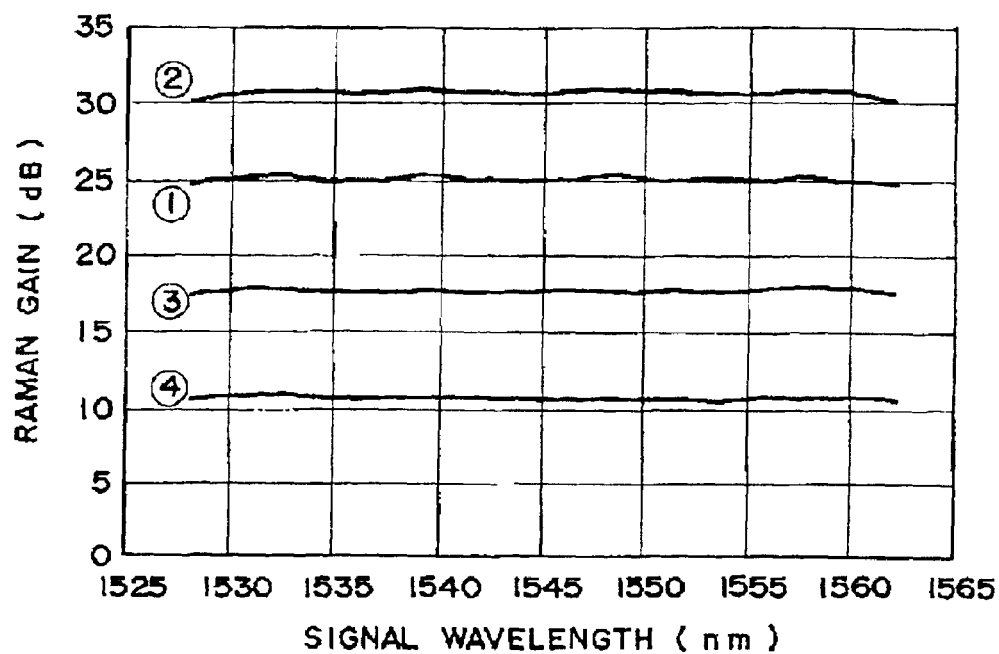
FIG. 2 is a Raman gain profile in an embodiment of the present invention.

Next, in a similar manner, by controlling the semiconductor laser diodes 71 through 74 by the current controller 81, the light intensity of the semiconductor laser diodes 71 through 73 was reduced to 31.2% and the light intensity of the semiconductor laser diode 74 was reduced to 60%, as shown in (4) of Table 4. The respective light intensities of the semiconductor laser diodes 71 through 74 at that time were 77.688 mW, 53.04 mW, 39.936 mW, and 158.7 mW (The intensity of the light output from each of the semiconductor laser diodes 71 and 74 is ½ thereof). The gain at this time is within the range of 10.44 to 10.73 dB, and is in a substantially flat state, as shown in FIG. 2, (4).

Figure 3:
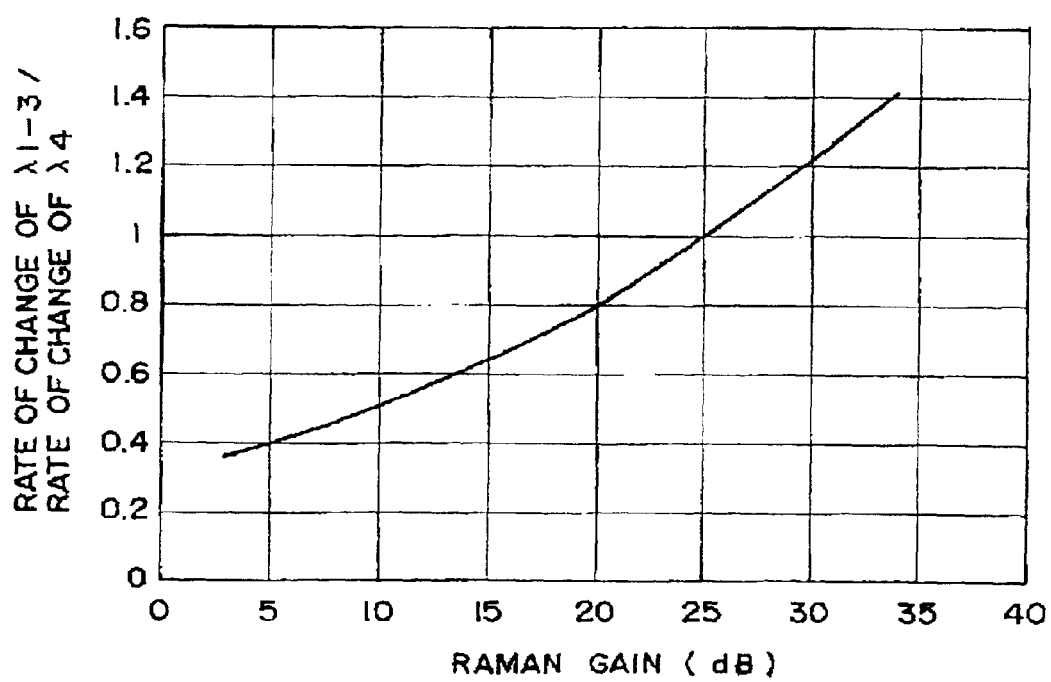
FIG. 3 is a property diagram showing the relationship between the rate of change in pump power at the shorter wavelength group with respect to the rate of change in drive current at the longer wavelength group and the Raman gain.

The drive current at the shorter wavelength group and the drive current at the longer wavelength group were collectively controlled to further vary the intensity of the light from each semiconductor laser diode in a manner other than that of the above-mentioned four examples so as to obtain a substantially flat gain over the entire signal wavelength band. Table 5 shows the percentage of the pump power, using the above-mentioned 100% as a reference. FIG. 3 is a graph plotting the measurement values. The vertical axis (Y-axis) indicates the rate of change of the semiconductor laser diodes 71 through 73 with respect to the rate of change of the semiconductor laser diode 74, and the horizontal axis (X-axis) indicates the gain properties.

This graph is considerably in conformity with the curve according to the following expression:

$$Y=0.0006X^2+0.0129X+0.3202$$

TABLE 5

| λ1–3 % | λ4 % | Raman gain dB | λ1–3/λ4 |
|---|---|---|---|
| 7.2 | 20.0 | 2.95 | 0.360 |
| 17.1 | 40.0 | 6.37 | 0.428 |
| 20.0 | 45.0 | 7.30 | 0.444 |
| 31.2 | 60.0 | 10.54 | 0.520 |
| 40.0 | 69.0 | 12.80 | 0.580 |
| 53.7 | 80.0 | 16.13 | 0.671 |
| 60.0 | 84.0 | 17.54 | 0.714 |
| 80.0 | 93.6 | 21.61 | 0.855 |
| 100.0 | 100.0 | 25.00 | 1.000 |
| 120.0 | 106.7 | 28.14 | 1.125 |
| 140.0 | 113.0 | 30.57 | 1.239 |
| 160.0 | 120.0 | 32.55 | 1.333 |
| 180.0 | 127.5 | 34.13 | 1.412 |

Thus, to obtain an arbitrary Raman gain α by using an optical component according to this embodiment, α is substituted in the X of the above equation to obtain the value of Y, and solely by adjusting the light intensities of both wavelength groups while setting the ratio of the light intensity of the shorter wavelength group to the light intensity of the longer wavelength group such that it becomes equal to the above value of Y, it is possible to obtain an arbitrary flat gain property.

Figure 4:
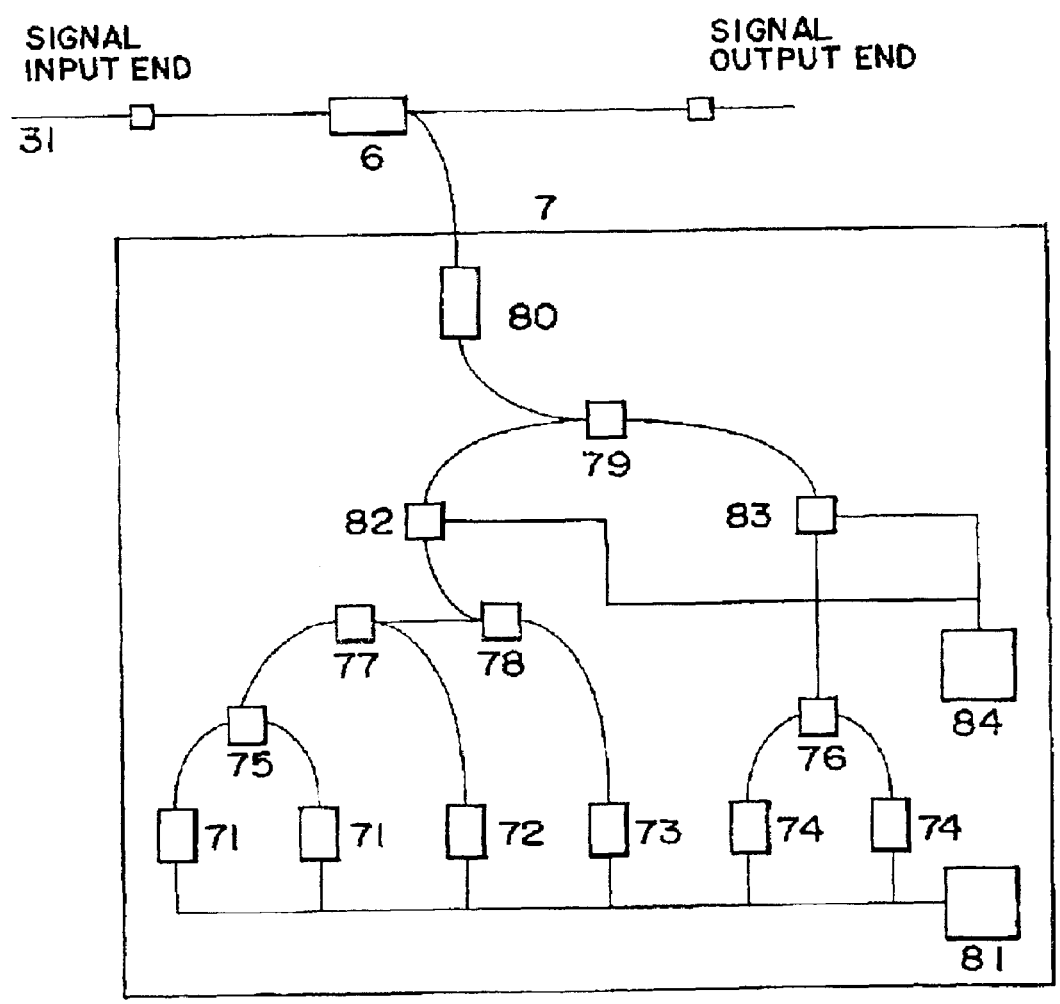
FIG. 4 is a schematic diagram showing another embodiment of the present invention.
Figure 5:
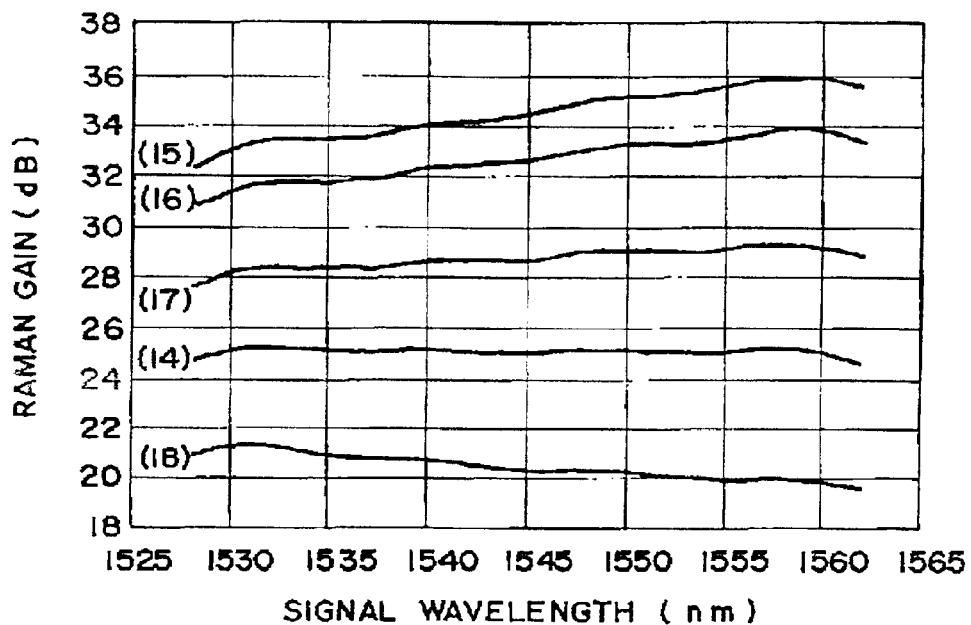
FIG. 5 is a property diagram showing the relationship between signal wavelength and Raman amplification gain when the gain coefficient of an optical fiber is changed.
Figure 6:
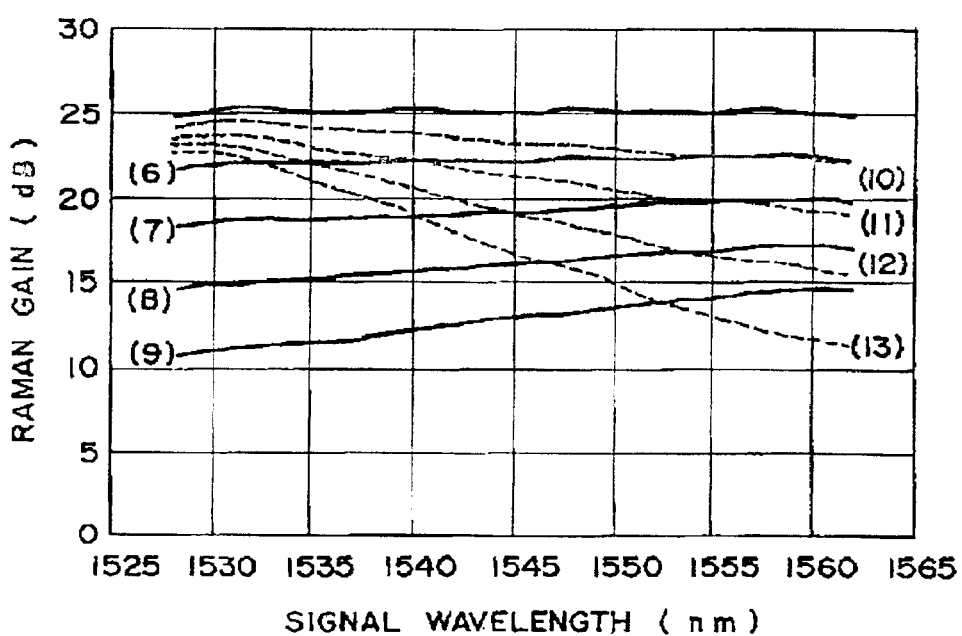
FIG. 6 is a property diagram showing the relationship between signal wavelength and Raman amplification gain when the pump power supplied to the optical fiber is changed.
Figure 7:
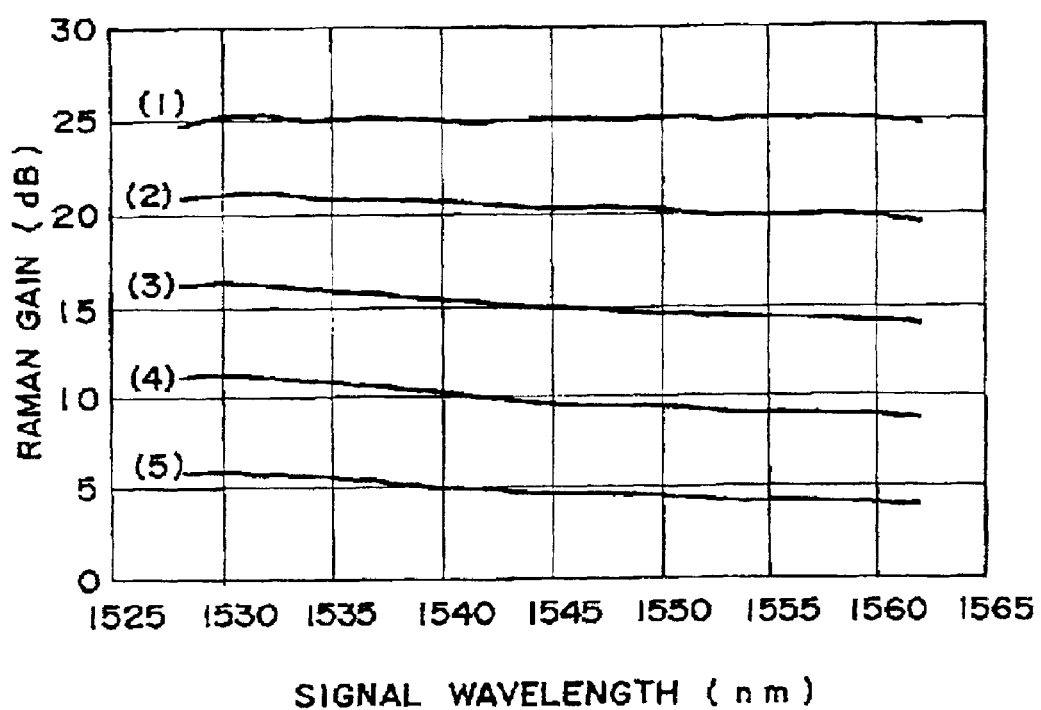
FIG. 7 is a property diagram showing the relationship between signal wavelength and Raman amplification gain when the pump power supplied to the optical fiber is changed.
Figure 8:
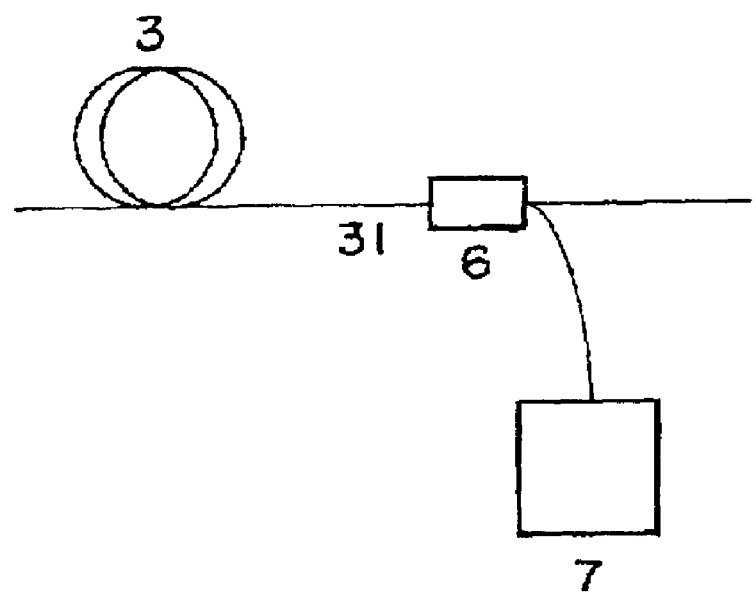
FIG. 8 is a schematic diagram showing an ordinary Raman amplifier.
Figure 9:
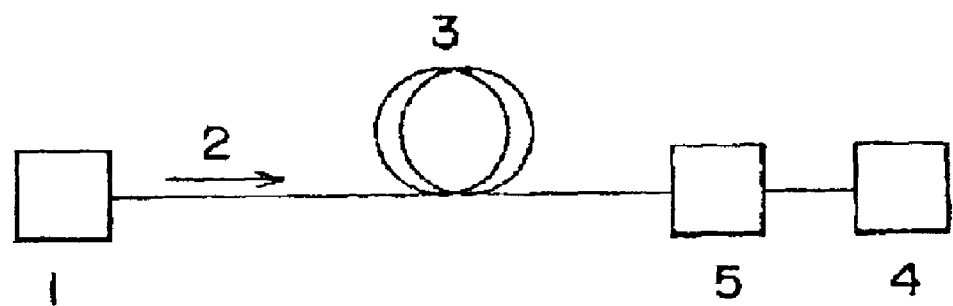
FIG. 9 is a schematic diagram showing an ordinary backward pumping type Raman amplification system.

FIG. 4 is a schematic diagram showing another embodiment of the present invention. In the drawing, 82 and 83 indicate optical attenuators, and 84 indicates a controller for controlling the attenuation amount thereof. The other components are the same as those of FIG. 1.

The lightwaves from the semiconductor laser diodes 71·71 are coupled in the polarization beam combiner 75 such that their states of polarization differ from each other by 90 degrees before being output. Similarly, the lightwaves from the semiconductor laser diodes 74·74 are coupled in the polarization beam combiner 76 such that their states of polarization differ from each other by 90 degrees before being output. The lightwaves from the semiconductor laser diodes 71·71, coupled by the polarization beam combiner 75, and the lightwave from the semiconductor laser diode 72 are coupled by the wavelength optical multiplexer 77. The lightwaves from the semiconductor laser diodes 71·71 and 72, coupled by the wavelength optical multiplexer 17, and the lightwave from the semiconductor laser diode 73 are coupled by the wavelength optical multiplexer 78. The lightwaves output from the wavelength optical multiplexer 78 and the polarization beam combiner 76 are attenuated by the optical attenuators 82 and 83, respectively and then coupled by the wavelength optical multiplexer 79 before being guided to the optical coupler 6 through the isolator 80 and then guided to the Raman amplification medium 31.

The effect achieved in the above state is the same as that of the embodiment shown in FIG. 1.

In the above-described embodiments, the cases are explained where there are three-light sources at the shorter wavelength group and one light source at the longer wavelength group. The present invention, may be also applied to other cases where the number of light sources for each group is not the number disclosed above. However, it is always necessary to provide a plurality of light sources for the shorter wavelength group. Needless to say, the light source for each group may include one or more wavelengths.

While, in the above embodiments, the cases are explained where a flat gain distribution is attained, it is also possible to impart an arbitrary inclination to the gain profile through adjustment of the rate of fluctuation in the drive current of the semiconductor laser diodes at the shorter wavelength group and the drive current at the longer wavelength group.

INDUSTRIAL AVAILABILITY

As described above, in accordance with the present invention, solely by individually varying the light intensity of the shorter wavelength group and the light intensity of the longer wavelength group, it is advantageously possible to obtain a Raman amplifier having an arbitrary wavelength property superior in flatness and an arbitrary amplification gain. Further, it is possible to obtain a targeted gain with little adjustment.

What is claimed is:

1. A pump light source for Raman amplification for outputting a plurality of pump lightwaves for effecting Raman amplification on signal lightwaves input to a light transmission path, wherein:

the pump light source for Raman amplification is divided into light source whose oscillation wavelength is the shorter wavelength and light source whose oscillation wavelength is the longer wavelength;

a plurality of lightwaves emitted from the shorter wavelength light source and one or more lightwave emitted from the longer wavelength light source are coupled and output; and the plurality of lightwaves output from the shorter wavelength light source are increased or lowered at a same rate or the lightwave output from the longer wavelength light source is increased or lowered at another same rate to be collectively controlled to adjust the intensity of the output light.

2. A pump light source for Raman amplification for outputting a plurality of pump lightwaves for effecting Raman amplification on signal lightwaves input to a light transmission path, wherein:

the pump light source for Raman amplification is divided into light source whose oscillation wavelength is the shorter wavelength and light source whose oscillation wavelength is the longer wavelength;

a plurality of lightwaves emitted from the shorter wavelength light source and one or more lightwave emitted from the longer wavelength light source are coupled and output;

the plurality of lightwaves output from the shorter wavelength light source or the lightwave output from the longer wavelength light source is to be collectively controlled to adjust the intensity of the output light, and drive currents for a plurality of light sources at the shorter wavelength are increased or lowered at a same rate to be collectively controlled to adjust the output light intensity at the shorter wavelength.

3. A pump light source for Raman amplification for outputting a plurality of pump lightwaves for effecting Raman amplification on signal lightwaves input to a light transmission path, wherein:

the pump light source for Raman amplification is divided into light source whose oscillation wavelength is the shorter wavelength and light source whose oscillation wavelength is the longer wavelength;

a plurality of lightwaves emitted from the shorter wavelength light source and one or more lightwave emitted from the longer wavelength light source are coupled and output;

the plurality of lightwaves output from the shorter wavelength light source or the lightwave output from the longer wavelength light source to be collectively controlled to adjust the intensity of the output light; and lightwaves oscillated from a plurality of light sources whose lightwave is the shorter wavelength are coupled and collectively controlled by a optical attenuator to thereby adjust the output light intensity at the shorter wavelength.

4. A pump light source for Raman amplification according to claim 1, wherein: the intensity of the oscillation light at the shorter wavelength and the intensity of the oscillation light at the longer wavelength are simultaneously adjusted.

5. A pump light source for Raman amplification according to claim 4, wherein: the intensity of the oscillation light at the shorter wavelength and the intensity of the oscillation light at the longer wavelength are varied in proportion of 1 to 0.81.

6. A pump light source for Raman amplification according to claim 4, wherein: the intensity of the oscillation light at the shorter wavelength and the intensity of the oscillation light at the longer wavelength are varied in proportion of 1 to 1.40.

7. A pump light source for Raman amplification according to claim 4, wherein: the intensity of the oscillation light at the shorter wavelength and the intensity of the oscillation light at the longer wavelength are varied in proportion of 1 to 1.92.

8. A Raman amplification system, comprising:

a light transmitting station for emitting signal lightwaves, a light receiving station for receiving the signal lightwaves, a light transmission path for propagating the signal lightwaves from the light transmitting station to the light receiving station, and a pump light source for Raman amplification which introduces pump lightwaves into the light transmission path to cause Raman scattering in the light transmission path to effect Raman amplification on the signal lightwaves, wherein: the pump light source for Raman amplification is divided into light source whose oscillation wavelength is the shorter wavelength and light source whose oscillation wavelength is the longer wavelength;

a plurality of lightwaves emitted from the shorter wavelength light source and one or more lightwave emitted from the longer wavelength light source are coupled and output; and the plurality of lightwaves output from the shorter wavelength light source are increased or lowered at a same rate or the lightwave output from the longer wavelength light source is increased or lowered at another same rate to be collectively controlled to adjust the intensity of the output light.

9. A Raman amplification system, comprising:

a light transmitting station for emitting signal lightwaves, a light receiving station for receiving the signal lightwaves, a light transmission path for propagating the signal lightwaves from the light transmitting station to the light receiving station, and a pump light source for Raman amplification which introduces pump lightwaves into the light transmission path to cause Raman scattering in the light transmission path to effect Raman amplification on the signal lightwaves, wherein: the pump light source for Raman amplification is divided into light source whose oscillation wavelength is the shorter wavelength and light source whose oscillation wavelength is the longer wavelength;

a plurality of lightwaves emitted from the shorter wavelength light source and one or more lightwave emitted from the longer wavelength light source are coupled and output;

the plurality of lightwaves output from the shorter wavelength light source or the lightwave output from the longer wavelength light source is collectively controlled to adjust the intensity of the output light; and drive currents for a plurality of light sources at the shorter wavelength are increased or lowered at a same rate to be collectively controlled to adjust the output light intensity at the shorter wavelength.

10. A Raman amplification system, comprising:

a light transmitting station for emitting signal lightwaves, a light receiving station for receiving the signal lightwaves, a light transmission path for propagating the signal lightwaves from the light transmitting station to the light receiving station, and a pump light source for Raman amplification which introduces pump lightwaves into the light transmission path to cause Raman scattering in the light transmission path to effect Raman amplification on the signal lightwaves, wherein: the pump light source for Raman amplification is divided into light source whose oscillation wavelength is the shorter wavelength and light source whose oscillation wavelength is the longer wavelength;

a plurality of lightwaves emitted from the shorter wavelength light source and one or more lightwave emitted from the longer wavelength light source are coupled and output;

the plurality of lightwaves output from the shorter wavelength light source or the lightwave output from the longer wavelength light source to be collectively controlled to adjust the intensity of the output light; and lightwaves oscillated from a plurality of light sources whose lightwave is the shorter wavelength are coupled and collectively controlled by a optical attenuator to thereby adjust the output light intensity at the shorter wavelength.

11. The Raman amplification system of claim 8, wherein: the intensity of the oscillation light at the shorter wavelength and the intensity of the oscillation light at the longer wavelength are simultaneously adjusted.

12. The Raman amplification system of claim 11, wherein: the intensity of the oscillation light at the shorter wavelength and the intensity of the oscillation light at the longer wavelength are varied in proportion of 1 to 0.81.

13. The Raman amplification system of claim 11, wherein:

the intensity of the oscillation light at the shorter wavelength and the intensity of the oscillation light at the longer wavelength are varied in proportion of 1 to 1.40.

14. The Raman amplification system of claim 11, wherein:

the intensity of the oscillation light at the shorter wavelength and the intensity of the oscillation light at the longer wavelength are varied in proportion of 1 to 1.92.

* * * * *